(12) United States Patent
Paschotta et al.

(10) Patent No.: US 7,016,103 B2
(45) Date of Patent: Mar. 21, 2006

(54) MULTIWAVELENGTH LIGHT SOURCE USING AN OPTICAL PARAMETRIC OSCILLATOR

(75) Inventors: Rudiger Paschotta, Zürich (CH); Thomas Sudmeyer, Zürich (CH); Kurt Weingarten, Zürich (CH); David C. Hanna, Southampton (GB)

(73) Assignee: Time-Bandwith Products AG, Zurich (CH)

( * ) Notice: Subject to any disclaimer, the term of this patent is extended or adjusted under 35 U.S.C. 154(b) by 117 days.

(21) Appl. No.: 10/363,633

(22) PCT Filed: Sep. 6, 2001

(86) PCT No.: PCT/CH01/00538

§ 371 (c)(1),
(2), (4) Date: Jul. 11, 2003

(87) PCT Pub. No.: WO02/21643

PCT Pub. Date: Mar. 14, 2002

(65) Prior Publication Data

US 2004/0095634 A1    May 20, 2004

Related U.S. Application Data

(60) Provisional application No. 60/230,336, filed on Sep. 6, 2000.

(51) Int. Cl.
*G02F 1/39* (2006.01)
(52) U.S. Cl. ...................... 359/330; 359/326
(58) Field of Classification Search ........ 359/326–332; 372/21–22
See application file for complete search history.

(56) References Cited

U.S. PATENT DOCUMENTS

| | | | |
|---|---|---|---|
| 5,828,424 A | | 10/1998 | Wallenstein |
| 5,894,489 A | | 4/1999 | Halldorsson et al. |
| 6,154,310 A | * | 11/2000 | Galvanauskas et al. ..... 359/328 |
| 6,233,089 B1 | * | 5/2001 | Nebel .......................... 359/330 |
| 6,480,325 B1 | * | 11/2002 | Batchko et al. ............. 359/330 |
| 2004/0075883 A1 | * | 4/2004 | Galvanauskas et al. ..... 359/330 |

OTHER PUBLICATIONS

Au Aus der J et al: "16.2-W Average Power From a Diode-pumped Femtosecond Yb: YAG Thin Disk Laser", Optics Letters, Optical Society of America, Washington, US, vol. 25, No. 11, Jun. 1, 2000 pp. 859-861, XP000951881.
Sudmeyer T et al: "Femtosecond fiber-feedback optical parametric oscillator", Optics Letters, Mar. 1, 2001, Opt. Soc. America, USA, vol. 26, No. 5, pp. 304-306, XP002198272.

* cited by examiner

*Primary Examiner*—John D. Lee
(74) *Attorney, Agent, or Firm*—Rankin, Hill, Porter & Clark LLP (57) ABSTRACT

An apparatus for generating at least three visible light beams of different output wavelengths for display purposes includes a passively mode-locked solid-state thin-disk laser and a device, including an optical parametric oscillator (OPO) for at least partially converting the primary light beam into electromagnetic radiation having the at least three different output wavelengths. The OPO is preferably an optical fiber feedback OPO. An optical fiber feedback OPO includes a nonlinear optical element and feedback device for feeding back at least a portion of the radiation emitted by the nonlinear medium to the nonlinear element. The feedback device includes an optical fiber.

43 Claims, 6 Drawing Sheets

MULTIWAVELENGTH LIGHT SOURCE USING AN OPTICAL PARAMETRIC OSCILLATOR

BACKGROUND OF THE INVENTION

1. Field of the Invention

This invention relates to apparatus for producing electromagnetic radiation of three different wavelengths, especially red, green and blue light, using an optical parametric oscillator. It also relates to a method for producing light of at least three different wavelengths using an optical parametric oscillator.

Light sources of red, green and blue light (RGB systems) may comprise a laser primary light source and an optical parametric oscillator (OPO) for nonlinear conversion. More specifically, the OPO is usually synchronously pumped with picosecond or femtosecond pulses. This means that the OPO cavity usually must have the same length as the cavity of the primary laser or an integer fraction or multiple of this length. The OPO cavity length must be precisely stabilized to match the laser cavity length within typically a few tens of micrometers, depending on the pulse durations. Particularly with femtosecond pump pulses, the stabilization becomes rather critical and is seen as an important drawback of synchronously pumped OPOs.

An OPO consists of a similar cavity as a laser resonator cavity, but the gain in the OPO is generated in a nonlinear crystal (e.g., made of LBO, KTA etc.) which is pumped with the pulses from a laser. The nonlinear crystal of the OPO generates a signal wave, for which the OPO cavity is resonant, and a corresponding idler wave. Alternatively, the OPO cavity may be resonant for the idler wave. The circulating signal pulses are synchronized with the pump pulses. The wavelengths of signal and idler waves are determined by phase matching, which depends on the refractive indices of the nonlinear crystal, i.e., on the material, its temperature and the propagation directions. It has been shown (L. Lefort et al., Opt. Lett. 24 (1), 28, 1999) that the pulses generated by a synchronously pumped OPO can be more than 10 times shorter than the pump pulses.

2. Description of the Related Art

High average power picosecond or femtosecond laser systems are known in the art. WO 01/43242 discloses a so-called "thin-disk" laser being an ultrafast high average power system. A high average power picosecond laser system is described in Applied Phys. B, Vol. 17, pp. 19–25 (2000).

U.S. Pat. No. 5,828,424 discloses a combination of conversion stages for generating three different visible light wavelengths using a mode coupled Nd:YLF laser primary source with a wavelength of 1053 nm or 1047 nm. The apparatus of this patent, however, suffers from severe drawbacks. For example, the schemes anticipated in the patent all use nonlinear crystals (e.g., KTA) and/or phase matching schemes that require operation at elevated temperatures. Thus, elevated temperature control means are required. Also, the disclosed nonlinear crystals are somewhat expensive and difficult to obtain and tend to be damaged if the apparatus is run for a long time with high power.

SUMMARY OF THE INVENTION

The goal of this invention is to provide a practical source of red, green and blue light for display application which meets the following requirements:

high output power, ideally >10 W in each color high conversion efficiency, modest power and cooling requirements compact setup with as few components as possible stability of operation against vibrations, thermal drifts, changes in cavity length, etc.

durability (e.g., use materials with a minimum of long-term degradation problems)

According to a first aspect of the invention, the apparatus for generating at least three light beams of different output wavelengths comprises a passively mode-locked, solid-state thin-disk laser for emitting a primary light beam characterized by a primary beam effective wavelength, means for at least partially converting said primary light beam into electromagnetic radiation having at least three different output wavelengths, said means including an optical parametric oscillator (OPO).

According to a second aspect of the invention, the apparatus for generating at least three light beams of different output wavelengths comprises a short-pulse, high average power laser for emitting a primary light beam characterized by a primary beam effective wavelength, means for at least partially converting said primary light beam into electromagnetic radiation having at least three different output wavelengths, said means including a fiber feedback optical parametric oscillator.

It should be noted that in the context of this application, the term "light" always refers to electromagnetic radiation, not just in the visible range but in other wavelengths as well, i.e., the term "light" refers to visible, infrared and ultraviolet electromagnetic radiation.

A method of generating at least three light beams of different output wavelengths comprises the steps of producing a continuous train of picosecond or sub-picosecond pulses of primary laser light characterized by a primary beam effective wavelength, and at least partially converting, using non-linear optical elements, said primary light beam into electromagnetic radiation characterized by said at least three different output wavelengths, wherein said at least partially converting said primary light beam includes producing a signal beam and an idler beam in an Optical Parametric Oscillator (OPO), including the steps of exciting, by laser light pumping, a non-linear optical element placed in an optical resonator to emit at least a signal beam and an idler beam of coherent electromagnetic radiation, and partially feeding back said idler beam into said non-linear optical element using an optical fiber.

An OPO according to the invention (i.e. a device for emitting electromagnetic radiation when being optically pumped by coherent electromagnetic radiation having an input beam wavelength, wherein the input beam wavelength and at least two output beam wavelengths of the emitted electromagnetic radiation are mutually different) comprises a nonlinear optical element and feedback means for feeding back at least a proportion of the radiation emitted by the nonlinear medium to the nonlinear element, wherein the feedback means comprise an optical fiber.

A device for generating output electromagnetic radiation characterized by at least two different output beam wavelengths according to the invention comprises a pumping beam pulse laser for emitting coherent electromagnetic radiation having a pumping beam wavelength, wherein the pumping beam wavelength and at least two output beam wavelengths are mutually different, a nonlinear optical element placed in the beam path of the pumping beam and feedback means for feeding back at least a proportion of the radiation emitted by the nonlinear medium to the nonlinear element, wherein the feedback means comprise an optical fiber.

Finally, a method of generating electromagnetic radiation characterized by at least two different output beam wavelengths using a continuous train of picosecond or subpicosecond pulses of input coherent electromagnetic radiation having an input beam effective wavelength, comprises the steps of: directing said input coherent electromagnetic radiation onto an non-linear optical element, such that output electromagnetic radiation is produced, and feeding back a proportion of said output electromagnetic radiation to said non-linear optical element using a glass fiber, wherein said proportion of said output electromagnetic radiation is characterized by a single one of said output beam wavelengths.

The first key component of the apparatus according to the invention is a high-average power picosecond or femtosecond laser system. This gives the advantage of having very high peak power for each pulse with high-average power. High average power is taken to mean much larger than 10W, since, preferably, the output power of color should exceed 10W after several frequency conversion stages.

The preferred choice for a high-average power ultrafast system is a so-called "thin-disk" laser as described in WO 01/43242 or in the recent Optics Letters publication (Opt. Lett. Vol. 25, no. 11, 2000, pp. 859–861), both publications being herein incorporated by reference. However, the invention also works with a high average power picosecond laser system as described in Applied Phys. B. vol. 17, pp. 19–25, 2000 or with any other high average power picosecond or femtosecond pulse laser.

In the above mentioned WO 01/43242, it has been shown that a passively mode-locked thin-disk laser can be designed for high average output power. Such a passively mode-locked thin-disk laser features a solid-state laser gain medium with a cooling surface, the gain medium being preferably in the shape of a thin plate and being mounted on cooling means. The means for passive mode-locking may include a semiconductor saturable absorber mirror (SESAM) device. The optical resonator of the thin-disk laser may be designed such that the beam hits the thin-disk gain medium more than two times during each round-trip, whereby at least two hits with different angles of incidence occur such that a standing wave pattern in the thin-disk gain medium is at least partially eliminated.

A further key component of the invention is a fiber feedback OPO. This OPO solves the problem of critical cavity stability. This is achieved by the following measures: A very high parametric gain is provided by the use of pump pulses with high peak power and/or the use of a highly nonlinear crystal. Then an OPO cavity is used where most of the generated signal light—and possibly idler light as well—is coupled out directly after the nonlinear crystal. The remaining light is coupled into a (preferably single-mode) fiber, which can represent a large fraction of the total cavity length. The light transmitted through the fiber is then fed back into the nonlinear crystal.

A large fraction of the cavity length means that the product of the optical fiber refractive index and its lengths greatly exceeds the path length of the beam in the cavity outside the fiber.

This device in the context of this application is always referred to as OPO, since it comprises a feedback, although compared to Optical Parametric Oscillators with conventional cavities, relatively little radiation is fed back. According to the definition used throughout this application, a device is an OPO if it comprises a nonlinear optical medium and some feedback.

This system has the following advantages (see also Opt. Lett. 26, 304 (2001) and J. Phys. D. Appl. Phys. 34, 2433 (2001)):

Feedback with the fiber leads to a much more compact cavity setup. The cavity length would usually be at least a few meters, which leads to a large setup when the cavity is formed in the conventional way with mirrors and free space propagation.

Because of the strong output coupler transmission, optical losses in the feedback loop have only little influence on the power conversion efficiency of the OPO. This means that the system, compared with conventional OPO systems, is much less sensitive to losses which might result from fabrication errors or from aging of components. A high conversion efficiency is easily achieved.

The cavity length adjustment is also much less critical, even if very short pump pulses are used. This is because the very high parametric gain allows for efficient energy extraction, even if a cavity length mismatch provides weak overlap of the feedback signal pulses with the pump pulses in the crystal. For example, if the cavity length of the OPO is not perfectly matched to the primary laser, the pump pulse and the seed pulse will not perfectly overlap. However the high gain of the parametric amplifier allows for efficiency energy extraction even under conditions of poor overlap.

The cavity length tolerance can be further enhanced by broadening of the feedback pulses in the fiber due to nonlinear effects and/or dispersion. The OPO can still generate rather short signal pulses.

If the fiber parameters are suitably chosen, soliton pulse transmission in the fiber can be obtained. This allows the generation of shorter pulses, which may be desirable in cases where this facilitates further frequency conversion. For soliton transmission, a fiber with large enough soliton energy is required. At high powers, this means that a fiber with relatively large mode area should be used.

As already mentioned, the fiber feedback OPO is ideally combined with a powerful picosecond or femtosecond primary laser. In particular, a passively mode-locked femtosecond thin disk laser is an ideal primary beam source, because it provides a high average power without using amplification stages, a good conversion efficiency, and rather short pump pulses (e.g. 0.6 ps) which make efficient nonlinear conversion easier. The relatively low repetition rate (e.g. 35 MHz), which would normally lead to a quite large OPO setup, is no problem when a fiber feedback OPO is used where the low repetition rate is easily obtained by simply using a longer fiber.

The present invention encompasses a number of different conversion schemes. A nonlinear conversion scheme for an RGB system is defined by a certain combination of conversion steps and the wavelengths involved, and the details on how the required conversion stages are realized.

Desired features include: a small number of conversion stages, a good conversion efficiency, a compact and stable setup, flexibility to generate the desired visible wavelengths, the use of nonlinear crystals which do not tend to degrade with time operation of all components at or near room temperature, further power scalability.

In the following description, two schemes that can substantially meet the foregoing requirements are presented as preferred embodiments of the invention. Of course, other RGB schemes can also be used.

According to a first embodiment, an incoming primary IR laser light beam having a frequency of between 980 nm and 1100 nm is frequency doubled in a second harmonic generating means (SHG) and then directed onto an OPO. The green light output is composed of light that is directly transmitted through the OPO, or alternatively, is composed of a proportion of the SHG output. The signal output beam and the idler are, together with residual infrared frequency light from the SHG, directed onto two subsequent Sum Frequency Generation (SFG) stages, where the blue and the red light, respectively, are created. Aspects of this scheme have been described in the U.S. Pat. No. 5,828,424. However, although the possibility of a scheme of this type has been disclosed in the mentioned US patent, it has not been disclosed that it can be implemented exclusively with LBO crystals, which are all operated at or near room temperature, with critical phase matching (except the last SFG stage where even noncritical phase matching near room temperature is possible). The schemes anticipated in U.S. Pat. No. 5,828,424 all comprise the use of other nonlinear crystals (e.g., KTA) and/or phase matching schemes which require the operation at elevated temperatures.

The use of LBO with critical phase matching schemes has the following advantages:

Temperature-controlled ovens are not required, because all crystals can be operated at or near room temperature.

LBO crystals have been proven to be very damage resistant and thus promise to be suitable for long-term operation with high output powers without significant degradation of the frequency conversion.

LBO crystals are commercially available from various sources, and the prices are moderate even if large crystal sizes are needed. The moderate cost of large LBO crystals is important because it leaves a lot of room for further power scaling where larger beam diameters will be required.

However, such a scheme can be efficient only if a pump source with a rather large peak power is used. This is due to the relatively small nonlinearity of LBO crystals and the use of critical phase matching schemes that do not permit the use of strongly focused beams. While such restrictions may have prevented other people in the field from devising such a scheme, it can be fulfilled with the recently demonstrated passively mode-locked thin disk laser. This laser provides not only high average output powers, but also pulses which are about an order of magnitude shorter than pulses from other high-power mode-locked sources. This leads to very high peak powers in the megawatt domain where the above described nonlinear conversion scheme can be operated efficiently.

According to a second embodiment, the conversion scheme is set up as follows:

An OPO, directly pumped with a mode-locked laser at infrared wavelengths, generates a signal and idler output with wavelengths around 1.8 $\mu$m and 2.6 $\mu$m, respectively.

Blue light is generated by frequency doubling the signal output around 1.8 $\mu$m in two subsequent frequency doubling means.

Red light is generated by frequency doubling the idler output around 2.6 $\mu$m in two subsequent frequency doubling means.

Green light is obtained from an additional frequency doubling means, directly pumped with the primary laser. The residual infrared light from the frequency doubling means may actually be used to pump the OPO, instead of splitting the infrared pump beam.

This scheme, which has not been previously described, has the advantage that no sum frequency mixers are used that require pulses from two input beams to overlap spatially and temporally. Also, the scheme operates most of the conversion stages at long wavelengths where damage problems are less severe or even not likely to occur.

A preferred embodiment of an apparatus according to the invention comprises:

a passively mode-locked laser with high average power and short (preferably sub-picosecond) pulse duration, preferably a passively mode-locked thin disk laser means for at least partially converting said primary light beam into electromagnetic radiation having at least three different output wavelengths, wherein the only nonlinear crystals comprised in said means being LBO crystals which can be operated at or near room temperature.

preferably a fiber feedback OPO, forming the central part of the mentioned means for converting said primary light beam.

Such a system has the following advantages:

It contains a minimum number of components and is compact because it does not need any amplification stages and no temperature-controlled crystal ovens. It is also probably less expensive to manufacture, compared to other known systems.

It is compact and stable. The system is stable against small changes in the synch-pumped OPO cavity length, and losses within the OPO cavity, for example.

It can be scaled to very high output powers.

It has a very good power conversion efficiency because the pump laser is efficient and the conversion scheme allows the unconverted light from a part of the conversion stages to be recycled. This leads to moderate demands on electric power and cooling water.

It relies on easily available crystals which are very highly resistant to long-term degradation with time when operated with higher powers.

DETAILED DESCRIPTION OF THE PREFERRED EMBODIMENTS

In the following description, preferred embodiments of the invention are described with reference to the figures. It should be noted that the given dimensions, wavelengths, materials temperatures, etc. are mere examples and by no way limit the scope of the invention.

Figure 1:
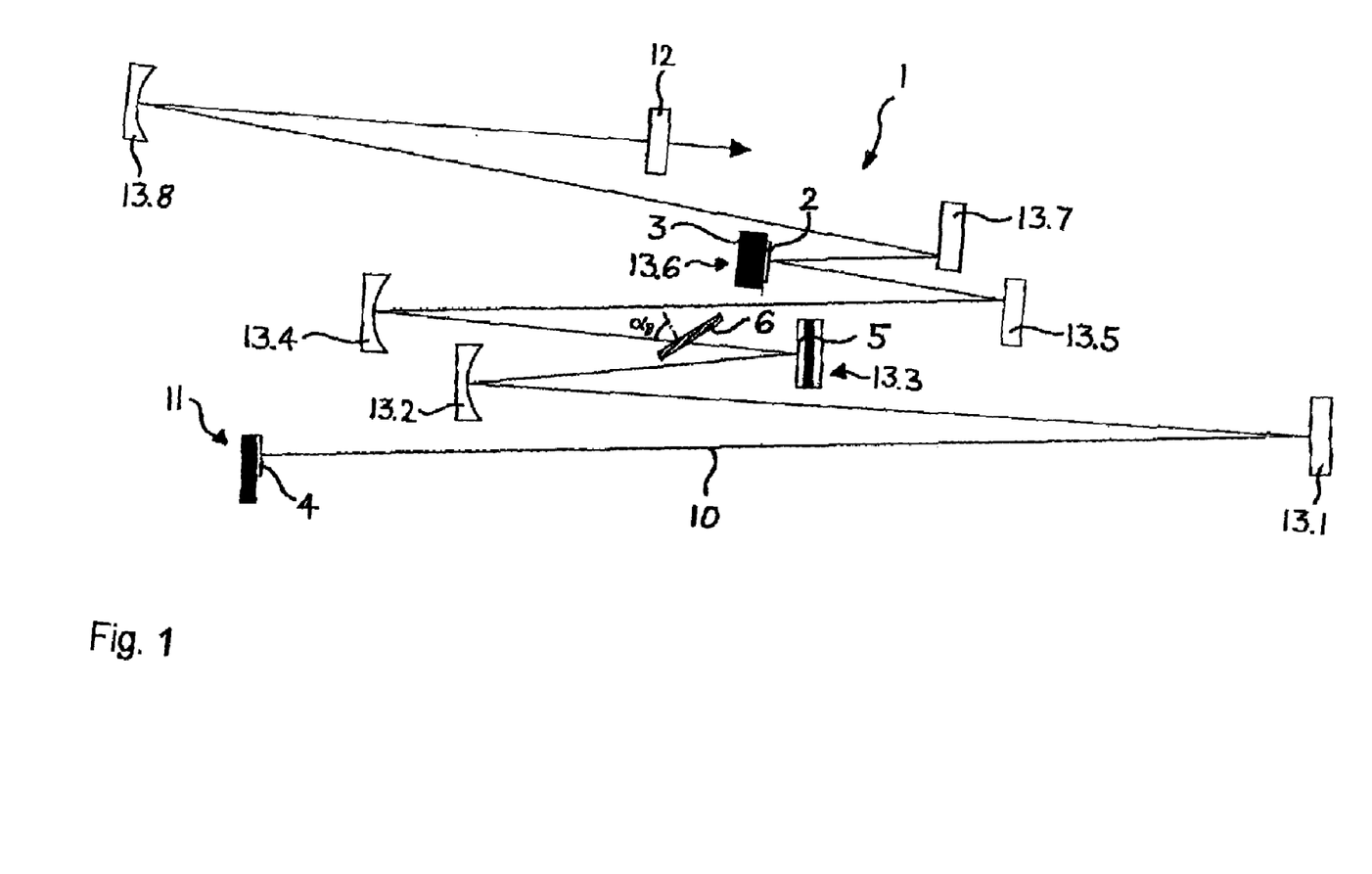
FIG. 1 is a schematic top plan view of thin disk pump laser of an apparatus according to the invention.

FIG. 1 shows a schematic, simplified illustration of a laser 1 according to the invention. The laser 1 comprises an optical resonator delimited by a first reflective element 11 and a second reflective element 12 for reflecting laser radiation 10. In the preferred embodiment of FIG. 1, the first reflective element 11 is a semiconductor saturable absorber mirror (SESAM) device 4 for passively mode locking the laser; it is described below with reference to FIG. 3. In other embodiments, the first reflective element 11 could be, for example, a dielectric mirror. The second reflective element 12 may, for example, be a partially reflecting outcoupling dielectric and/or metallic mirror.

The resonator shown in FIG. 1 is multiply folded by several folding mirrors 13.1–13.8. Their radii may be the following: $R_1=R_3=R_5=R_6=R_7=\infty$; $R_2=R_8=1.5$ m; $R_4=1$ m. The total length of the geometric path in the resonator 1 in this example is 10 m, corresponding to a repetition rate of 15 MHz. The lengths of the portions between the folding mirrors 13.1–13.8 may be calculated by comparison with FIG. 1 since FIG. 1 shows the lengths of the portions in a correct scale. Of course, many other laser resonator designs are possible for the pump laser.

A thin-disk laser head comprising a thin-disk solid-state laser gain medium 2 mounted on cooling means 3 is placed inside the optical resonator. The thin-disk laser head simultaneously acts as a folding mirror 13.6. Alternatively, the thin-disk laser head could be used as an end mirror 11 in the resonator cavity. The laser gain medium 2 is preferably optically pumped by light emitted by a laser diode (not shown) and impinging on a front surface of the thin disk 2. For purposes of clarity, means for exciting the laser gain medium 2 are not shown in FIG. 1.

The thin disk laser gain medium is preferably made of Yb:YAG. This laser gain material offers a very good efficiency of typically 50% and allows the generation of very short pulses with durations even below 1 ps. Other possible laser gain materials are, e.g., Yb:KGW, Yb:KYW, Nd:YAG, Nd:YVO$_4$ (neodymium vanadate), or semiconductors.

The laser of FIG. 1 still further comprises a Gires-Tournois interferometer (GTI) 5 as a dispersion-compensating means. The GTI 5 simultaneously acts as a folding mirror 13.3. An optional glass plate 6 is placed inside the optical resonator and oriented such that the angle of incidence of the laser beam 10 is equal to the Brewster angle $\alpha_B$ in order to obtain a linear polarization of the laser beam 10. The glass plate 6 could simultaneously be used for Kerr lens mode locking (KLM). Alternatively, the Kerr effect needed for KLM could be provided by an additional plate, by the laser gain medium 2 or by the GTI 5.

The primary beam source laser has the following parameters:

50–100 W average power at 1030 nm beam quality: $M^2<1.5$ pulse duration: 0.5–3 ps repetition rate: 10–100 MHz The design of the pump laser can, for example, be as described in Opt. Lett. 25, 859 (2000).

Figure 2:
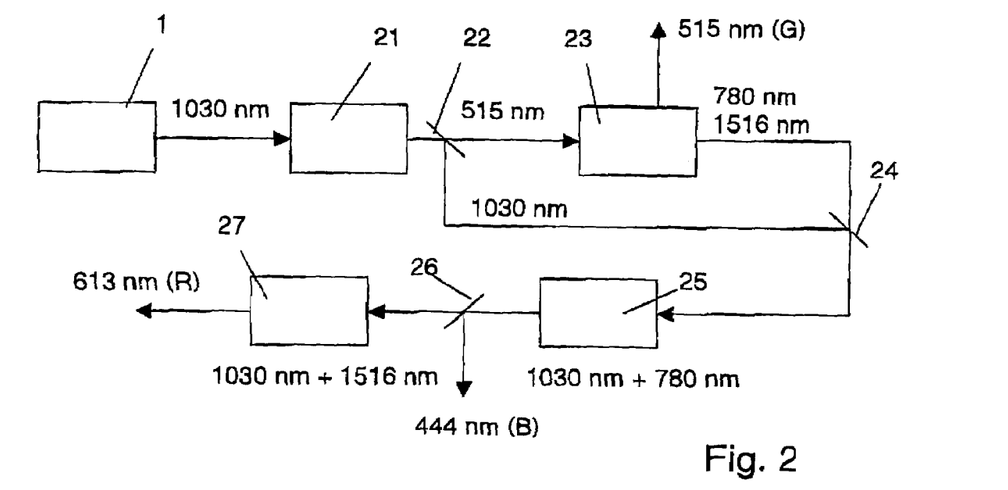
FIG. 2 is a scheme of a first embodiment of an apparatus according to the invention.

The apparatus of FIG. 2 comprises a pulsed laser 1 serving as a primary laser. In the described embodiment, the laser 1 emits infrared radiation with a wavelength of 1030 nm. The laser 1 is preferably, but not necessarily, a thin disk laser, e.g. of the kind described with reference to FIG. 1. The laser 1 may also be any other high average power picosecond or femtosecond pulse laser. A frequency doubling means 21, i.e. nonlinear crystal serving as second harmonic generation means, is placed in the output beam direction of the laser 1. The crystal may, for example, be a lithium triborate (LBO) crystal operated at or near room temperature.

For some applications, the wavelengths mentioned here are too short. This problem can be overcome by choosing a primary beam wavelength of about 1045 nm to 1080 nm, which can be obtained with a modified laser crystal material.

The transmitted 1030 nm primary light beam proportion is separated from the frequency doubled 515 nm light using a first wavelength selective element 22, which may, for example, be a mirror with a frequency dependent transparency/reflectivity. The 515 nm frequency doubled light beam is used as a pumping beam of an OPO 23.

An example of an OPO is described further below with reference to FIG. 5.

From the OPO, light beams with three different wavelengths are emitted. The transmitted proportion of the OPO 515 nm pumping beam is directed to an output of the apparatus and serves as green light source. A 780 nm signal beam and a 1516 nm idler beam are led together with the 1030 nm primary light beam proportion which was transmitted through the frequency doubler 21. For this purpose, a second mirror 24 with a frequency dependent transmittivity/reflectivity may be used. The resulting beam is guided to a first sum frequency generating means 25, where a 444 nm blue output beam is produced from 780 nm and 1030 nm beam proportions. The first sum frequency generating means 25 comprises an LBO crystal which can be operated at or near room temperature and with critical phase matching.

A third wavelength selective element 26 separates the 444 nm output beam from the other beam proportions and directs it to an output location. A second sum frequency generating means 27 produces a 613 nm red output beam from the 1030 nm and 1516 nm beam portions. The second sum frequency generating means 27 may comprise an LBO crystal which can be operated at or near room temperature with critical phase matching or even with non-critical phase matching.

Even if phase matching at room temperature is possible, one might operate the nonlinear crystal in a device which stabilizes its temperature somewhere near room temperature (such as within 40 K of room temperature), ideally at a somewhat elevated temperature like 40 degrees Celsius. This can be done, for example, with a Peltier element, and does not require a sophisticated oven construction, such as would be required to operate at a higher temperature like 200 degree Celsius. The slightly elevated temperature helps to avoid any problems with moisture and also allows the device to operate properly even if the ambient temperature is somewhat increased, for example, by excess heat dissipated by other components of the apparatus. Thus, phase matching near room temperature is advantageous, even if one still decides to operate at a slightly elevated temperature.

The method of generating at least three visible light beams of different output wavelengths for display purposes using this embodiment of the invention can be summarized as follows:

Step 1: Second Harmonic Generation in the frequency doubling means 21: 1030 nm→515 nm (green)

Step 2:OPO: 515 nm→780 nm+1516 nm (signal+idler)

Step 3:Sum Frequency Generation in the first sum frequency generation means 25: 1030 nm+780 nm→444 nm (blue)

Step 4:Sum Frequency Generation in the second sum frequency generation means 27 1030 nm+1516 nm→613 nm (red)

The order of the two SFG stages could be reversed. However, the given order seems to be good because the second stage has to operate with a lower 1030 nm pump power, and the efficiency is less critical in the stage for the red output because of the noncritical phase matching scheme.

One OPO mirror could be mounted on a piezo (or another movable part) in order to install a cavity length stabilization scheme.

As already mentioned, the involved wavelengths can be modified to adapt to other primary laser wavelengths or to the output wavelengths required from the concrete system.

Figure 3:
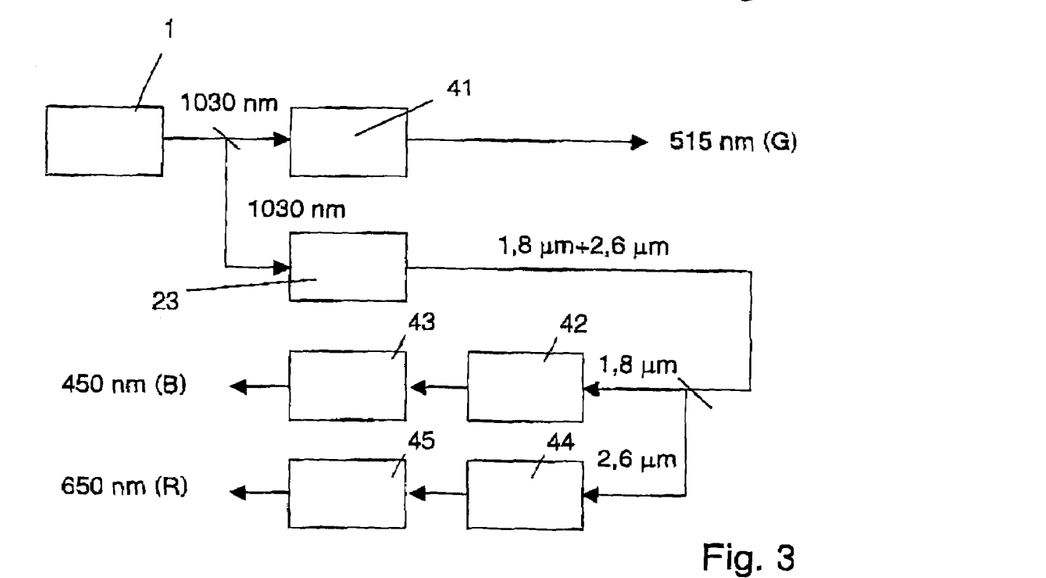
FIG. 3 is a scheme of a second embodiment of an apparatus according to the invention.

A scheme of a second apparatus according to the invention is shown in FIG. 3. The apparatus comprises a laser primary beam source 1, an OPO 23 and five nonlinear crystals 41, 42, 43, 44, 45 for serving as frequency doubling means. These components, as well as other optical elements, are similar to the components described with reference to FIG. 2 and are not again described here. The mode of operation of the apparatus as well as the corresponding method may be summarized as follows:

The OPO 23, directly pumped with a mode-locked laser at infrared wavelengths, generates a signal and idler output with wavelengths around 1.8 $\mu$m and 2.6 $\mu$m, respectively or with wavelength values slightly below.

Blue light is generated by frequency doubling the signal output around 1.8 $\mu$m in two subsequent frequency doubling means 42, 43.

Red light is generated by frequency doubling the idler output around 2.6 $\mu$m in two subsequent frequency doubling means 44, 45.

Green light is obtained from an additional frequency doubling means 41, directly pumped with the primary laser.

Figure 4:
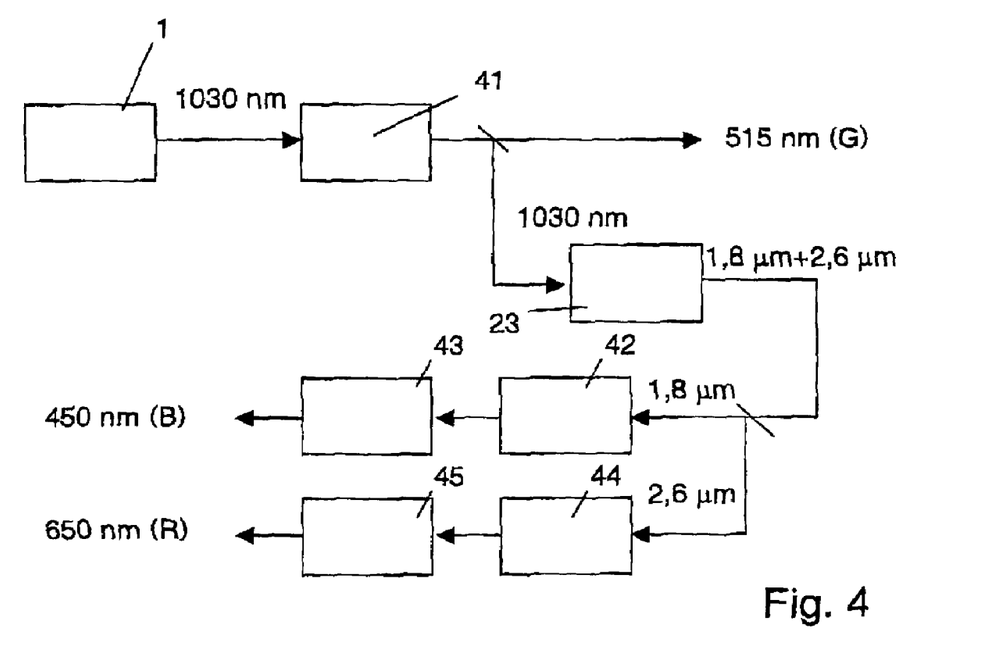
FIG. 4 is a scheme of a variant of the second embodiment of an apparatus according to the invention.

As an alternative to this set-up, the residual infrared light from the frequency doubling means 41 for obtaining green light may actually be used to pump the OPO, instead of splitting the infrared pump beam. This variant is depicted in FIG. 4.

Also, the frequency doubling means 42, 43 for generating blue light and the frequency doubling means 44, 45 for generating red light may, in principle, be identical, i.e. only one pair of frequency doubling means is present after the OPO, through which both the signal and the idler beam are directed. Finally, starting from the set-up of FIG. 3, the frequency doubling means for generating green light may be omitted by using the first of the frequency doubling means following the OPO and directing the residual pumping beam of the OPO through it and generating green light out of it. In order to obtain phase matching for different wavelengths simultaneously, periodically poled crystals with different grating periods would have to be produced in a single crystal.

Figure 5:
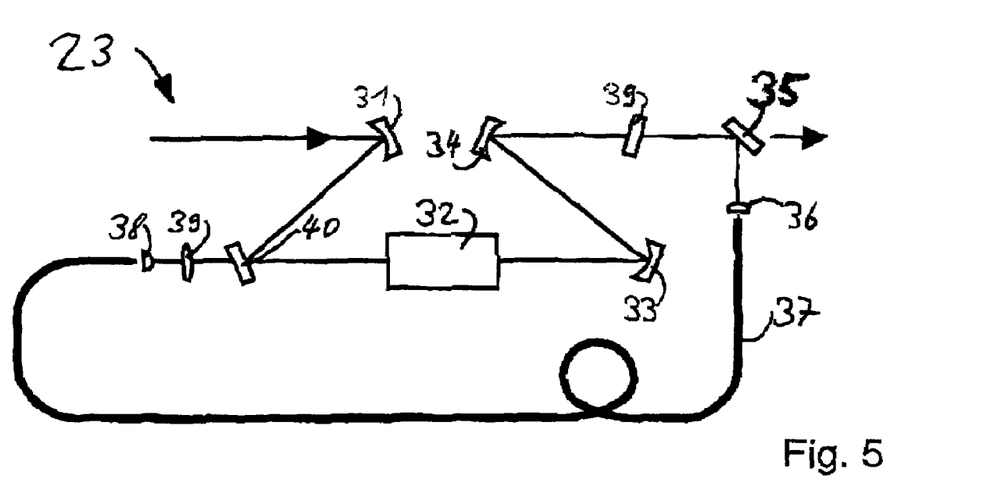
FIG. 5 is a schematic top plan view of a fiber feedback OPO of an apparatus according to the invention.

An example of an OPO according to the invention is shown in FIG. 5. The pump beam is focused with a curved mirror 31 to a waist with 90 $\mu$m radius in the middle of a nonlinear crystal 32. The crystal 32 may also be an LBO crystal which can be operated at or near room temperature, with critical phase matching or non-critical phase matching. Alternatively, the crystal may be a Periodically Poled LiTaO$_3$ (PPLT) crystal, a KTA crystal or any other known nonlinear crystal usable in an OPO (see also the discussion below). The crystal length is between 2 mm and 40 mm. After the nonlinear crystal, the signal wave is collimated by a second and a third mirror 33, 34. A further element 35 which is partially reflective for light of the signal wavelength separates a proportion of the signal beam from the other proportion of the signal beam, the idler beam and possible pumping beam proportions. The second 33 or the third 34 mirror may, as an alternative to the sketched set-up, be transparent for light of the pumping beam wavelength and possibly also of the idler beam wavelength, so that this mirror serves for coupling out the pumping beam proportion which is transmitted to the crystal and/or the idler beam.

The beam proportion reflected by the element 35 is used for the signal feedback, while the transmitted beam proportions represent the output. The feedback light is launched, via a first lens 36, into a 1.5–10 m long standard telecom fiber 37, which is single-mode at the signal wavelength. The light emerging from the fiber is mode-matched by two lenses 38, 39 and fed back into the crystal through a dichroic mirror 40, which is highly reflective for the pump wave and transmissive at the signal wavelength.

A notable feature of the fiber-feedback OPO, which results from the high gain and strong output coupling, is the insensitivity of the performance to cavity losses. In an experiment with a similar set-up, the maximum output power was shown to be reduced by only 6% if an additional filter with 10 dB loss at the signal wavelength was inserted at the fiber launch between the element 35 and lens 36. Obviously, it is not necessary to minimize the losses in the feedback loop after the output coupling.

Another favorable factor, relaxing the tolerances, is possible broadening of the feedback pulses in the fiber due to nonlinear effects and/or dispersion. The OPO can still generate rather short signal pulses.

The fiber-feedback OPO according to the invention may be used in a system of the kind described above, i.e. in an apparatus for generating red, green and blue light. However, it may used in any other setup where frequency conversion is an issue. As an example, it may be used to generate red light using green light (e.g., 515 nm input radiation –>a 642 nm signal ouput beam (red) and a 2603 nm idler output beam). It may, as another example, also be used to generate 1.55 $\mu$m wavelength pulses for data transmitting purposes. The expert will know many other examples where conversion of a light beam into a light beam of a different, longer wavelength is desired. The fiber feedback OPO according to the invention may also be used to modify the pulse shape of input pumping or primary beam pulses.

Figure 6:
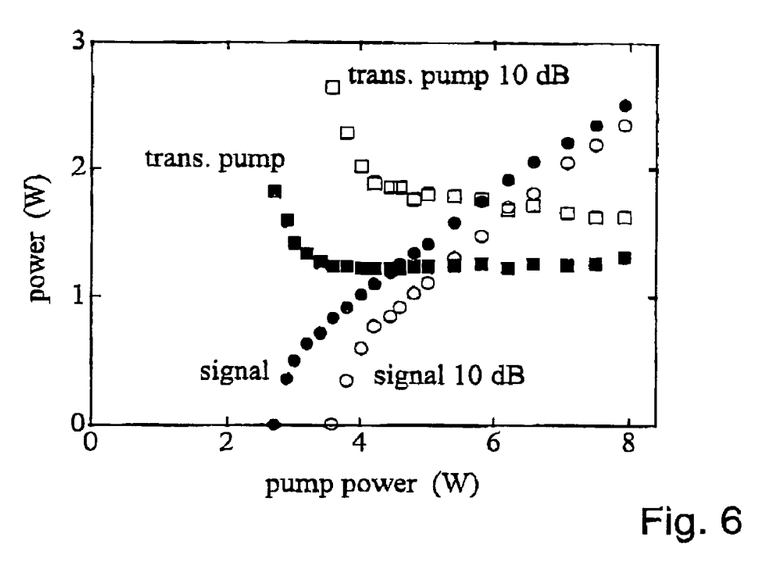
FIGS. 6 through 8 represent results of measurements made for characterizing a prototype fiber feedback OPO of the kind represented in FIG. 5.
Figure 7:
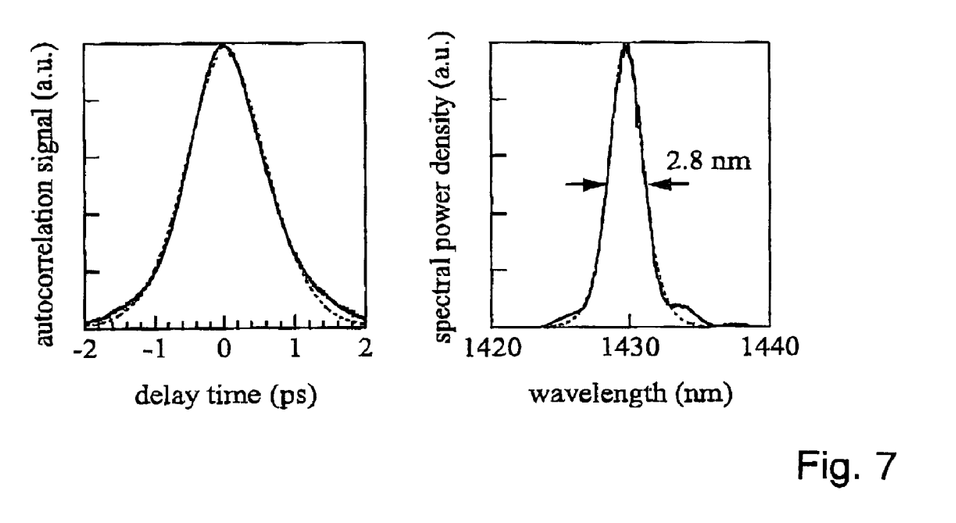
Figure 8:
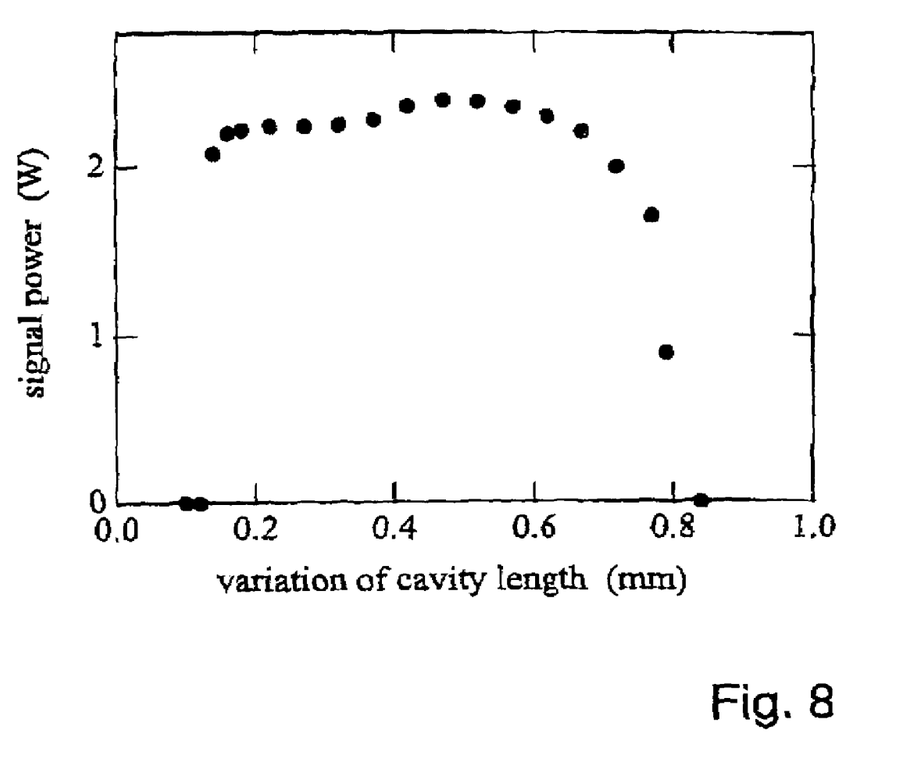

Measurement results are shown in FIGS. 6 through 8 for an OPO of the kind described with reference to FIG. 5 and further comprising a filter element 39 in the beam path. The Yb:YAG pump laser generates pulses with a duration of 0.6 ps at a repetition rate of 35 MHz, and delivers a pump power of 8.2 W. The achieved signal power output is between 2.3 W and 2.7 W. The crystal is a poled LiTaO3 (PPLT) crystal, which has a relatively high nonlinearity. The 22 mm long and 0.5 mm thick, uncoated crystal is operated at a temperature of 150° C. to avoid photorefractive damage. The OPO signal wavelength depends on the period of the poling pattern and the crystal temperature. The crystal has 8 poled regions of transverse width 1.2 mm, with different grating periods of 28.3 $\mu$m –29 $\mu$m, resulting in signal wavelengths between 1429 nm and 1473 nm (for 150° C. crystal temperature).

FIG. 6 shows the typical performance for one grating. As shown, the maximum output power is reduced by only 6% when an additional filter with 10 dB loss at the signal wavelength is inserted at the fiber launch between the element 35 and lens 36. This demonstrates the previously mentioned insensitivity to cavity losses.

The duration of the signal pulses is measured by auto intensity correlation as shown in FIG. 7. For all poled channels and pump powers, the pulse duration (FWHM) is typically around 700–900 fs assuming an ideal sech2 pulse shape. The spectral width is around 3–4 nm (FWHM), leading to a time-bandwidth product 0.36–0.53. For 2.5 W signal power at 1429 nm (grating period 28.3 µm), we obtain 870-fs pulses with a spectral width of 2.8 nm, leading to a time-bandwidth product of 0.36, which is not far from the Fourier limit.

Despite the short pulse duration, the adjustment of the fiber-feedback OPO cavity length is not critical because of the high parametric gain. For example, even if the leading edge of a signal pulse is temporally overlapped with the pump pulse in the crystal, the high parametric gain still allows for efficient energy extraction. Also, nonlinear effects in the fiber can lead to a substantial temporal broadening of the seed pulses. FIG. 8 shows that varying the round-trip length of the resonator over a range of 0.5 mm (corresponding to more than one FWHM pulse width) led to an output power reduction by less than 10%. Within this range, the pulse duration did not change significantly. The central wavelength of the optical spectrum changed less than 0.5 nm and the bandwidth less than 0.3 nm. The operation of the fiber-feedback OPO system is stable over hours, and no signs of crystal damage were observed during all experiments.

Numerous other embodiments may be envisaged, without departing from the spirit and scope of the invention.

What is claimed is:

1. An apparatus for generating at least three light beams of different output wavelengths comprising:
    a pulsed laser for emitting a primary light beam having a primary beam effective wavelength,
    means for at least partially converting said primary light beam into electromagnetic radiation having at least three different output wavelengths,
    wherein said means includes a fiber feedback optical parametric oscillator (OPO).

2. The apparatus according to claim 1, wherein said optical parametric oscillator comprises an LBO nonlinear crystal.

3. The apparatus according to claim 1, wherein said primary beam effective wavelength is between 980 nm and 1100 nm.

4. The apparatus according to claim 1, wherein said means for at least partially converting said primary light beam further comprises at least one frequency doubling means and at least one sum frequency generating means.

5. The apparatus according to claim 4, wherein said primary light beam source, said optical parametric oscillator (OPO), at least two frequency doubling means, light deflecting means, and dichroic elements are mutually arranged such that, if the primary light beam source emits electromagnetic radiation having an effective wavelength between 980 nm and 1100 nm:
    a first frequency doubling means produces green light by frequency doubling light of the primary light beam;
    the thus frequency doubled light is used for pumping said OPO; the residual pumping light of said OPO serving as green light output;
    blue light is generated by a first frequency sum generation means, of which the signal output of said OPO and residual primary light from said first frequency doubling means serve as input; and,
    red light is generated by a frequency sum generation means, of which the idler output of said OPO and residual primary light from said first frequency doubling means serve as input.

6. The apparatus according to claim 1, wherein said primary light beam source, said optical parametric oscillator (OPO), at least two frequency doubling means, light deflecting means and dichroic elements are mutually arranged such that, if the primary light beam source emits electromagnetic radiation having an effective wavelength between 980 nm and 1100 nm:
    the OPO is directly pumped with said primary light beam and generates a signal and idler output;
    blue light is generated by frequency doubling the signal output in two subsequent frequency doubling means;
    red light is generated by frequency doubling the idler output in two subsequent frequency doubling means; and,
    green light is obtained from a frequency doubling means, which is directly pumped with a primary beam portion.

7. The apparatus of claim 6, wherein said frequency doubling means for obtaining green light includes first frequency doubling means being pumped with the primary light beam and wherein the residual primary light beam portion from said first frequency doubling means is used for pumping the OPO.

8. The apparatus according to claim 1, wherein said optical parametric oscillator comprises a plurality of nonlinear optical elements, and wherein at least some of the nonlinear optical elements allow operation at or near room temperature.

9. The apparatus according to claim 8, wherein all of the nonlinear optical elements contained in the apparatus are selected so as to permit operation at or near room temperature.

10. The apparatus according to claim 8, wherein at least some of the nonlinear optical elements are LBO crystals.

11. The apparatus according to claim 10, wherein all nonlinear optical elements contained in the apparatus are LBO crystals.

12. The apparatus according to claim 1, wherein one of said at least three different light beams generated is an unconverted proportion of said primary light beam, and wherein the output wavelength of said one light beam corresponds to the input wavelength.

13. The apparatus according to claim 1, wherein at least one of said at least three light beams is an infrared light beam.

14. The apparatus according to claim 1, wherein the pulsed laser is mode-locked.

15. The apparatus according to claim 14, wherein the pulsed, mode-locked laser is a solid state thin-disk laser.

16. An apparatus for generating at least three visible light beams of different output wavelengths comprising:
    a short-pulse high average power laser for emitting a primary light beam having a primary beam effective wavelength;
    means for at least partially converting said primary light beam into electromagnetic radiation having at least three different output wavelengths, said means including a fiber feedback optical parametric oscillator (OPO).

17. The apparatus according to claim 16, wherein the laser for emitting a primary light beam comprises means for generating sub-picosecond pulses.

18. The apparatus according to claim 16, wherein the laser for emitting a primary light beam is designed such that it can be operated at average output powers exceeding 50 W.

19. The apparatus according to claim 16, wherein said optical parametric oscillator comprises a plurality of nonlinear optical elements, and wherein at least some of the optically nonlinear elements permit operation at or near room temperature.

20. The apparatus according to claim 19, wherein all of the nonlinear optical elements of the apparatus permit operation at or near room temperature.

21. The apparatus according to claim 19, wherein all nonlinear optical elements of the apparatus are LBO crystals.

22. The apparatus according to claim 16, wherein at least some of the nonlinear optical elements are LBO crystals.

23. The apparatus according to claim 16, wherein said primary light beam source, said optical parametric oscillator (OPO), at least two frequency doubling means and light deflecting means and dichroic elements are mutually arranged such that, if the primary light beam source emits electromagnetic radiation characterized by an effective wavelength between 980 nm and 1100 nm:
a first frequency doubling means produces green light by frequency doubling light of the primary light beam;
the thus frequency doubled light is used for pumping said OPO; the residual pumping light of said OPO serving as green light output;
blue light is generated by a first frequency sum generation means, of which the signal output of said OPO and residual primary light from said first frequency doubling means serve as input; and,
red light is generated by a frequency sum generation means, of which the idler output of said OPO and residual primary light from said first frequency doubling means serve as input.

24. The apparatus according to claim 16, wherein said primary light beam source, said optical parametric oscillator (OPO), at least two frequency doubling means and light deflecting means and dichroic elements are mutually arranged such that, if the primary light beam source emits electromagnetic radiation characterized by an effective wavelength between 980 nm and 1100 nm:
the OPO is directly pumped with said primary light beam and generates a signal and idler output;
blue light is generated by frequency doubling the signal output in two subsequent frequency doubling means;
red light is generated by frequency doubling the idler output in two subsequent frequency doubling means; and,
green light is obtained from a frequency doubling means, which is directly pumped with a primary beam portion.

25. The apparatus according to claim 24, wherein said frequency doubling means for obtaining green light includes first frequency doubling means being pumped with the primary light beam, and wherein the residual primary light beam portion from said first frequency doubling means is used for pumping the OPO.

26. The apparatus according to claim 16, wherein said primary beam effective wavelength is between 980 nm and 1100 nm.

27. The apparatus according to claim 16, wherein one of said at least three different light beams generated is an unconverted proportion of said primary light beam, and wherein the output wavelength of said one light beam corresponds to the input wavelength.

28. A method of generating at least three light beams of different output wavelengths comprising the steps of:
producing a continuous train of picosecond or sub-picosecond pulses of primary laser light characterized by a primary beam effective wavelength; and,
at least partially converting, using non-linear optical elements, said primary light beam into electromagnetic radiation having at least three different output wavelengths;
wherein said at least partially converting said primary light beam includes producing a signal beam and an idler beam in an Optical Parametric Oscillator (OPO) including the steps of:
exciting, by laser light pumping, a non-linear optical element placed in an optical resonator to emit at least a signal beam and an idler beam of coherent electromagnetic radiation; and,
partially feeding back said idler beam into said non-linear optical element using an optical fiber.

29. The method according to claim 28, wherein said primary beam effective wavelength is between 980 nm and 1100 nm.

30. The method according to claim 29, wherein:
green light is produced by frequency doubling light of the primary light beam;
the thus frequency doubled green light is used for pumping said OPO;
the residual pumping light of said OPO serving as green light output;
blue light is produced, using a non-linear optical element and phase matching techniques, by generating a sum frequency beam of the signal output of said OPO and residual primary light from said first frequency doubling means; and,
red light is produced, using a non-linear optical element and phase matching techniques, by generating a sum frequency beam of the idler output of said OPO and residual primary light from said first frequency doubling means.

31. The method according to claim 29, wherein:
the OPO is directly pumped with said primary light beam and generates a signal output and an idler output;
blue light is generated by twice frequency doubling the signal output;
red light is generated by twice frequency doubling the idler output; and, green light is obtained by frequency doubling a primary beam portion.

32. The method according to claim 31, wherein residual primary light beam portion from producing the green light is used for pumping the OPO.

33. The method according to claim 28, wherein said optical parametric oscillator comprises a plurality of non-linear optical elements, and wherein said non-linear optical elements are operated at or near room temperature.

34. A device for emitting electromagnetic radiation when being optically pumped by coherent electromagnetic radiation having by an input beam wavelength, the input beam wavelength and at least two output beam wavelengths of the emitted electromagnetic radiation being mutually different, the device comprising a nonlinear optical element and feedback means for feeding back at least a portion of the radiation emitted by the nonlinear medium to the nonlinear element, wherein the feedback means comprise an optical fiber.

35. The device according to claim 34, wherein the nonlinear medium has two end faces, radiation characterized by said at least two output beam wavelengths being emitted through a first one of said end faces, and the feedback means and the nonlinear element being arranged such that radiation emitted through said first end face is fed back through a second one of said two end faces.

36. The device according to claim 34, wherein said optical fiber is a single mode optical fiber.

37. The device according to claim 36, wherein the diameter, the refractive index, and in-coupling means of said optical fiber are such that radiation characterized by the shorter one of said at least two output wavelength, a signal wavelength, is fed back to the nonlinear medium.

38. The device according to claim 34, wherein the fiber is a standard telecom optical glass fiber.

39. The device according to claim 34, wherein said device does not include active controlling means for stabilizing the length of the feedback path.

40. The device according to claim 34, wherein the nonlinear optical element is a $\chi^2$ nonlinear optical element.

41. A device for generating output electromagnetic radiation having at least two different output beam wavelengths, comprising:
- a pumping beam pulse laser for emitting coherent electromagnetic radiation having a pumping beam wavelength and a beam path, the pumping beam wavelength and said at least two output beam wavelengths being mutually different;
- a nonlinear optical element placed in the beam path of the pumping beam; and,
- feedback means for feeding back at least a portion of the radiation emitted by the nonlinear medium to the nonlinear element, wherein the feedback means comprise an optical fiber.

42. A method of generating electromagnetic radiation having at least two different output beam wavelengths using a continuous train of picosecond or sub-picosecond pulses of input coherent electromagnetic radiation having an input beam effective wavelength, comprising the steps of:
- directing said input coherent electromagnetic radiation onto a non-linear optical element such that output electromagnetic radiation is produced; and,
- feeding back a portion of said output electromagnetic radiation to said non-linear optical element using a glass fiber;
- wherein said portion of said output electromagnetic radiation includes a single one of said output beam wavelengths.

43. The method according to claim 42, wherein the non-linear optical element has two end faces, and wherein radiation of said at least two output beam wavelengths being emitted through a first one of said end faces, and wherein radiation emitted through said first end face is fed back through a second one of said two end faces.

* * * * *